(12) United States Patent
Furukawa et al.

(10) Patent No.: US 11,035,490 B2
(45) Date of Patent: Jun. 15, 2021

(54) SOLENOID VALVE DEVICE

(71) Applicant: Eagle Industry Co., Ltd., Tokyo (JP)

(72) Inventors: Kenta Furukawa, Tokyo (JP);
Hiroyuki Iwanaga, Tokyo (JP);
Yoshinari Kasagi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/757,635

(22) PCT Filed: Nov. 16, 2018

(86) PCT No.: PCT/JP2018/042389
§ 371 (c)(1),
(2) Date: Apr. 20, 2020

(87) PCT Pub. No.: WO2019/102931
PCT Pub. Date: May 31, 2019

(65) Prior Publication Data
US 2020/0332910 A1    Oct. 22, 2020

(30) Foreign Application Priority Data

Nov. 22, 2017 (JP) .............................. JP2017-225042

(51) Int. Cl.
*F16K 31/06* (2006.01)
*F16K 27/04* (2006.01)

(52) U.S. Cl.
CPC ...... *F16K 31/0613* (2013.01); *F16K 31/0675* (2013.01); *F16K 27/048* (2013.01)

(58) Field of Classification Search
CPC .. F16K 31/0613; F16K 31/0675; F16K 31/06; F16K 27/048
See application file for complete search history.

(56) References Cited

U.S. PATENT DOCUMENTS

| 8,931,758 B2 * | 1/2015 | Kasagi | ................ F16K 31/0613 251/129.07 |
| 2012/0199771 A1 | 8/2012 | Kasagi et al. | ........... 251/129.15 |
| 2017/0314700 A1 | 11/2017 | Iwanaga et al. | .... F16K 31/0675 |

FOREIGN PATENT DOCUMENTS

| JP | 2002-310322 | 10/2002 | ............. F16K 31/06 |
| JP | 2003-329164 | 11/2003 | ............. F16K 31/06 |

(Continued)

OTHER PUBLICATIONS

International Search Report and Written Opinion issued in PCT/JP18/42389, dated Feb. 19, 2019, with English translation, 18 pages.

(Continued)

*Primary Examiner* — Eric Keasel
(74) *Attorney, Agent, or Firm* — Hayes Soloway P.C.

(57) ABSTRACT

A solenoid valve main body has a space with an annular shape continually formed in a circumferential direction between a sleeve and the stator, a first breathing hole which allows an outside of the solenoid valve main body to communicate with the space and a second breathing hole which allows the space to communicate with the accommodation portion. The first breathing hole and the second breathing hole are positioned such that a clockwise distance and an anticlockwise distance in the circumferential direction from the first breathing hole to the second breathing hole are different from each other.

16 Claims, 8 Drawing Sheets

(56) References Cited

FOREIGN PATENT DOCUMENTS

| | | | | |
|---|---|---|---|---|
| JP | 2005-308161 | 11/2005 | ............ | F16K 31/06 |
| JP | 2006-29351 | 2/2006 | ............ | F16K 31/06 |
| JP | 2006-177491 | 7/2006 | ............ | F16K 31/06 |
| JP | 2010-151165 | 7/2010 | ............ | F16K 31/06 |
| WO | 2011/052371 | 5/2011 | ............ | F16K 31/06 |
| WO | 2016/076188 | 5/2016 | ............ | F16K 31/06 |

OTHER PUBLICATIONS

International Preliminary Report on Patentability issued in PCT/JP18/42389, dated May 26, 2020, 9 pages.

\* cited by examiner

SOLENOID VALVE DEVICE

TECHNICAL FIELD

The present invention relates to a solenoid valve device, particularly, to a solenoid valve device suitable for hydraulic control of a hydraulic circuit.

BACKGROUND ART

There is known a conventional solenoid valve device for hydraulic control (for example, refer to Patent Citation 1), including a valve housing and a solenoid valve main body that is mounted into a mounting hole formed in the valve housing. The solenoid valve main body includes a valve unit and s solenoid unit, the valve unit including a sleeve, a spool accommodated in the sleeve, and a retainer closing one end portion of the sleeve, the solenoid unit including a plunger driving the spool in an axial direction and a solenoid case accommodating a molded solenoid body where a solenoid is covered with resin. The solenoid valve device is disposed between a pressure source such as a pump or an accumulator and a load side device to supply a control oil, of which the pressure or the flow rate is regulated by driving the spool, to the load side device.

In such the conventional solenoid valve device, since the drive stroke of the spool is relatively large, when the solenoid unit is driven, a fluid such as air or oil (hereinafter, simply referred to as a fluid) in an inner space of an accommodation portion accommodating the plunger becomes resistance to prevent a rapid movement of the plunger, which is a problem. For this reason, the solenoid valve main body adopts a structure where a breathing hole penetrating through the sleeve in a radial direction is formed in the sleeve and the accommodation portion communicates with outside through the breathing hole, and thus, as the plunger reciprocates, the fluid is allowed to move between the accommodation portion and the outside of the solenoid valve main body, namely, so-called breathing is performed; and thereby, the resistance imposed by the fluid as the plunger moves is reduced, and the responsiveness of the solenoid valve main body is improved.

CITATION LIST

Patent Literature

Patent Citation 1: WO 11-052371 A (page 7 and first drawing)

SUMMARY OF INVENTION

Technical Problem

In the aforesaid conventional solenoid valve main body, an amount of the fluid equivalent to an amount of the fluid discharged by the movement of the plunger during drive flows into the solenoid valve main body from outside through the breathing hole; however, since the breathing hole formed in the sleeve communicates with the accommodation portion through a linear flow path, contaminants which exist around outside the solenoid valve main body easily penetrate into the accommodation portion, and the contaminants prevent the movement of the plunger, which is a problem.

The present invention is made in light of such problems, and an object of the present invention is to provide a solenoid valve device capable of reducing the possibility of contaminants penetrating into an accommodation portion while improving the responsiveness of a solenoid valve main body.

Solution to Problem

In order to solve the foregoing problems, a solenoid valve device according to the present invention includes:
a solenoid valve main body which includes a spool, a sleeve in which the spool is movably disposed in an axial direction, a plunger moving the spool, a stator, a molded solenoid body disposed at an outer periphery of the plunger, and a solenoid case accommodating the plunger, the stator, and the molded solenoid body, at least a part of the plunger being disposed in an accommodation portion defined by the stator and the molded solenoid body; and
a valve housing in which the solenoid valve main body is mounted by inserting the sleeve of the solenoid valve main body into a mounting hole of the valve housing, wherein
the solenoid valve device is provided with an annular shape is continually formed in a circumferential direction between the sleeve and stator, a first breathing hole which allows an outside of the solenoid valve main body to communicate with the space and a second breathing hole which allows the space to communicate with the accommodation portion,
the first breathing hole and the second breathing hole being positioned such that a clockwise distance and an anticlockwise distance in the circumferential direction from the first breathing hole to the second breathing hole are different from each other.

According to the aforesaid feature, since a fluid which has flown into the space from the first breathing hole is divided into a first fluid which travels a short distance in the space in the circumferential direction, for example, the clockwise circumferential direction to flow into the second breathing hole, and a second fluid which travels a long distance in the space in the circumferential direction, for example, the anticlockwise circumferential direction to flow into the second breathing hole, contaminants having heavy specific gravity and contained in the fluid traveling the long distance can effectively fall to a lower side of the space and thereby, it is possible to reduce the possibility of the contaminants penetrating into the accommodation portion, and due to the fluid traveling the short distance, it is possible to improve the responsiveness of the solenoid valve main body.

The second breathing hole may be formed to face vertically upward in a state where the solenoid valve main body is mounted in the valve housing. In this case, the contaminants which are contained in a fluid flowing outside the solenoid valve main body through the first breathing hole of the sleeve are easily accumulated in a lower portion of the space formed between the stator and the sleeve due to the own weight of the contaminants; and thereby, it is possible to effectively prevent the contaminants from penetrating into the accommodation portion.

The first breathing hole may be formed to face horizontally in a state where the solenoid valve main body is mounted in the valve housing. In this case, the contaminants are easily accumulated in the lower portion of the space formed between the stator and the sleeve.

The first breathing hole may be provided in the sleeve and the second breathing hole is provided in the stator. In this case, it is possible to adjust the clockwise and the anticlockwise circumferential distances between the first breathing hole and the second breathing hole by adjusting the relative rotational position between the sleeve and the stator upon the assembly of the solenoid valve main body.

A flow path cross-sectional area in the space may be larger than a flow path cross-sectional area of the first breathing hole. In this case, the flow speed of the fluid which has flown into the space from the first breathing hole is reduced; and thereby, it is easy for the fluid to temporarily stay in the space, and the contaminants are easily accumulated below in the space.

An end portion of the sleeve which is connected to the solenoid case may be formed with a stadium shape including a pair of linear portions and a pair of circular arc portions in a cross section perpendicular to the axial direction, and the first breathing hole is formed in the linear portion of the end portion formed in the stadium shape. In this case, since the first breathing hole is formed in the linear portion of the end portion with the stadium shape, it is easy to find out the position of the first breathing hole, and as a result it is easy to dispose the first breathing hole at a target position, which is set in advance, in the circumferential direction.

BRIEF DESCRIPTION OF DRAWINGS

FIG. 6A is a front view illustrating a state where the solenoid case and the valve housing are cut out, and FIG. 6B is a cross-sectional view taken along a line C-C shown in FIG. 6A.

FIG. 7 is a cross-sectional view taken along the line A-A shown in FIG. 1, for describing the breathing path of the solenoid valve main body in a state where the solenoid valve main body switches from OFF to ON.

FIG. 8A is a view illustrating a state where the solenoid valve main body switches from OFF to ON, and FIG. 8B is a view illustrating a state where the solenoid valve main body switches from ON to OFF.

DESCRIPTION OF EMBODIMENTS

Hereinafter, modes of a solenoid valve device according to the present invention will be described based on an embodiment.

Example

A solenoid valve device according to an embodiment of the present invention will be described with reference to FIGS. 1 to 8. Incidentally, a plunger 34, a rod 35, and a spool 7 illustrated in FIGS. 2 and 7 are not illustrated in cross-sectional views but illustrated in side views.

A solenoid valve main body 3 is a spool-type solenoid valve, and is used in a hydraulically controlled device such as an automatic transmission of a vehicle. A solenoid valve device 1 is a device in which the solenoid valve main body 3 is assembled into a valve housing 2 as illustrated in FIGS. 2 and 3.

Figure 1:
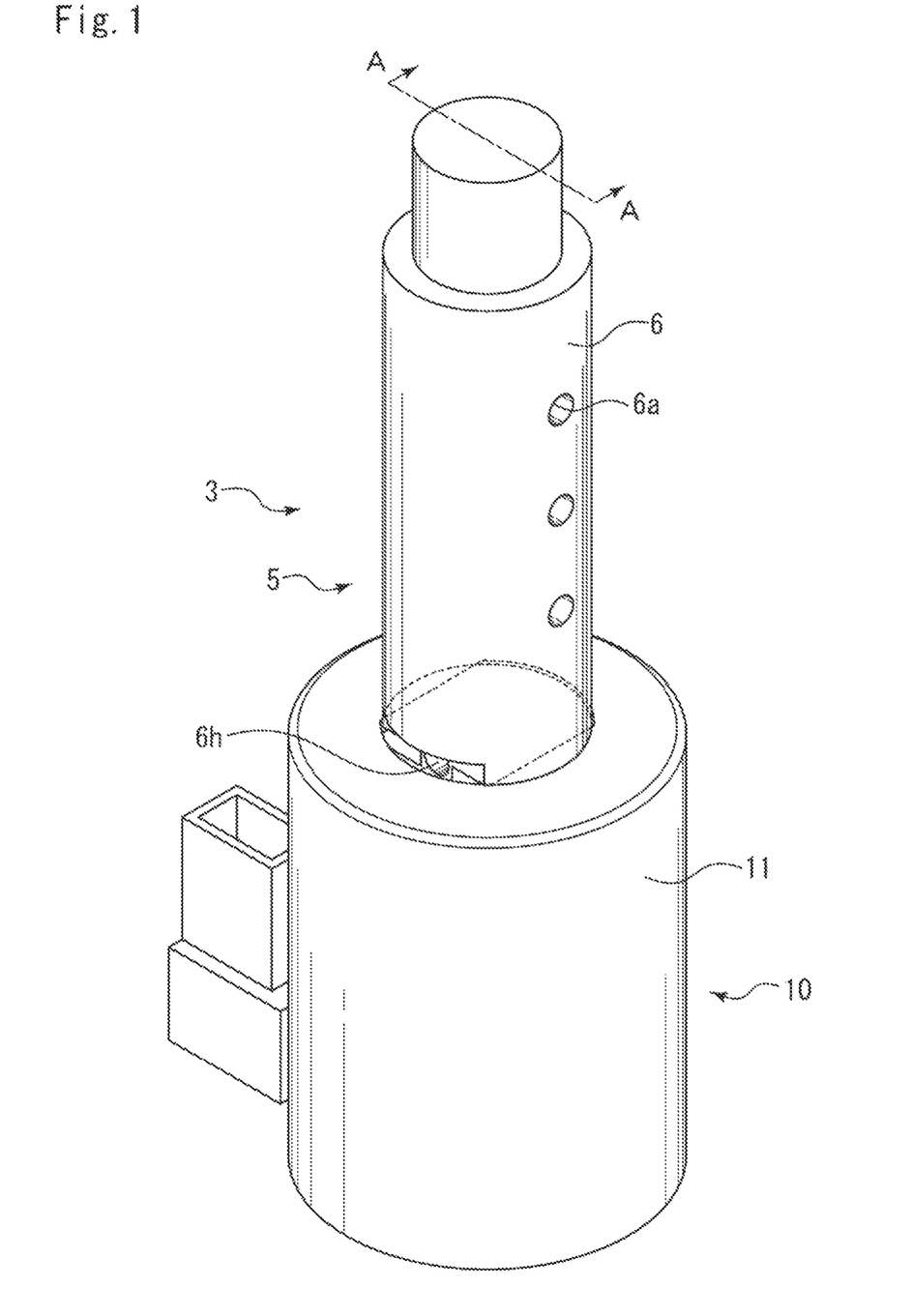
FIG. 1 is a perspective view illustrating a solenoid valve main body according to an embodiment of the present invention.

As illustrated in FIG. 1, the solenoid valve main body 3 is configured such that a valve unit is integrally mounted on a solenoid unit 10, the valve unit 5 serving as a valve for regulating the flow rate of a fluid, the solenoid unit 10 being a linear solenoid serving as an electromagnetic drive unit. The mounting of the valve unit 5 will be described later in detail.

Figure 2:
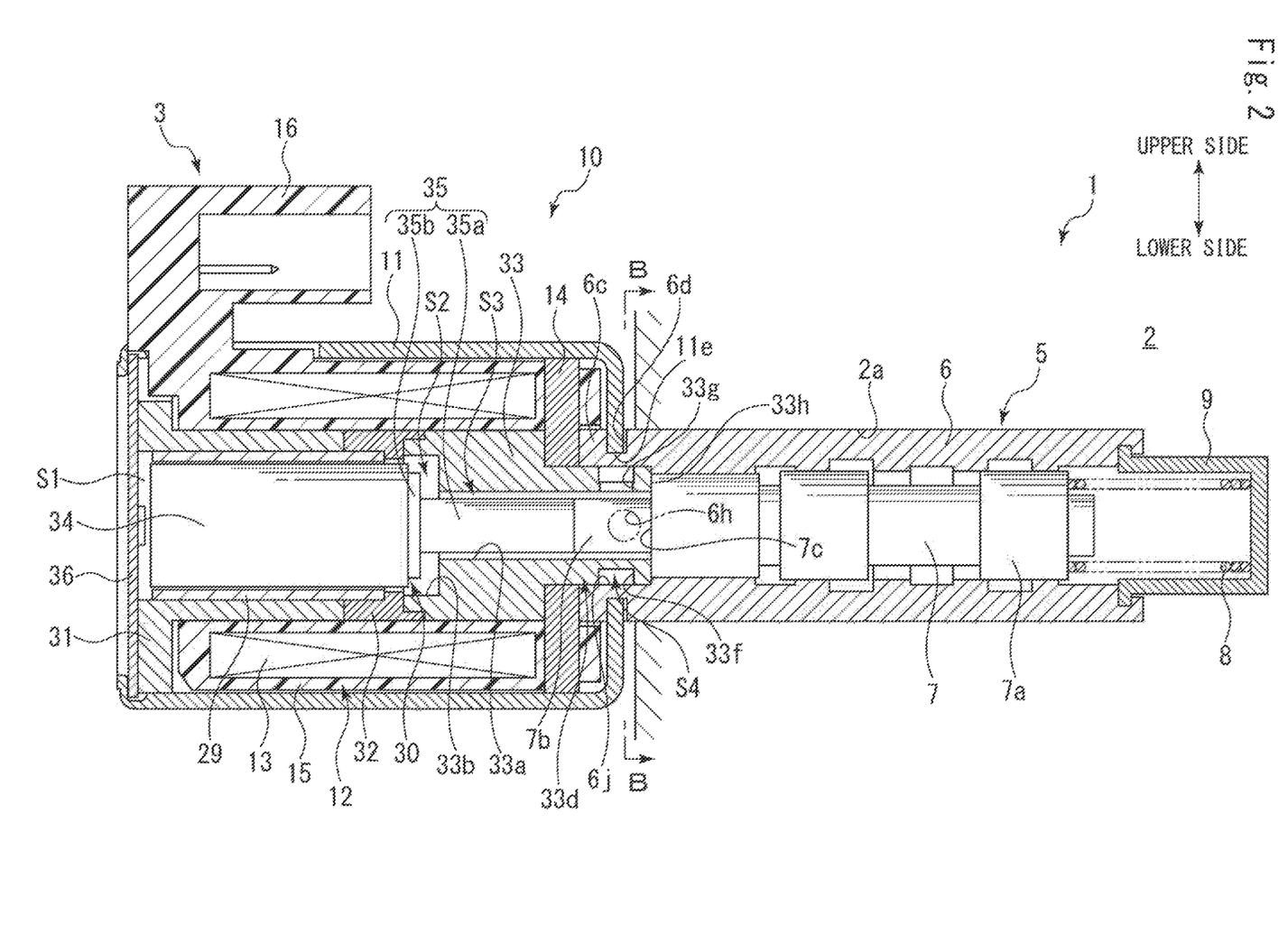
FIG. 2 is a cross-sectional view of the solenoid valve main body and a valve housing as taken along a line A-A shown in FIG. 1.
Figure 3:
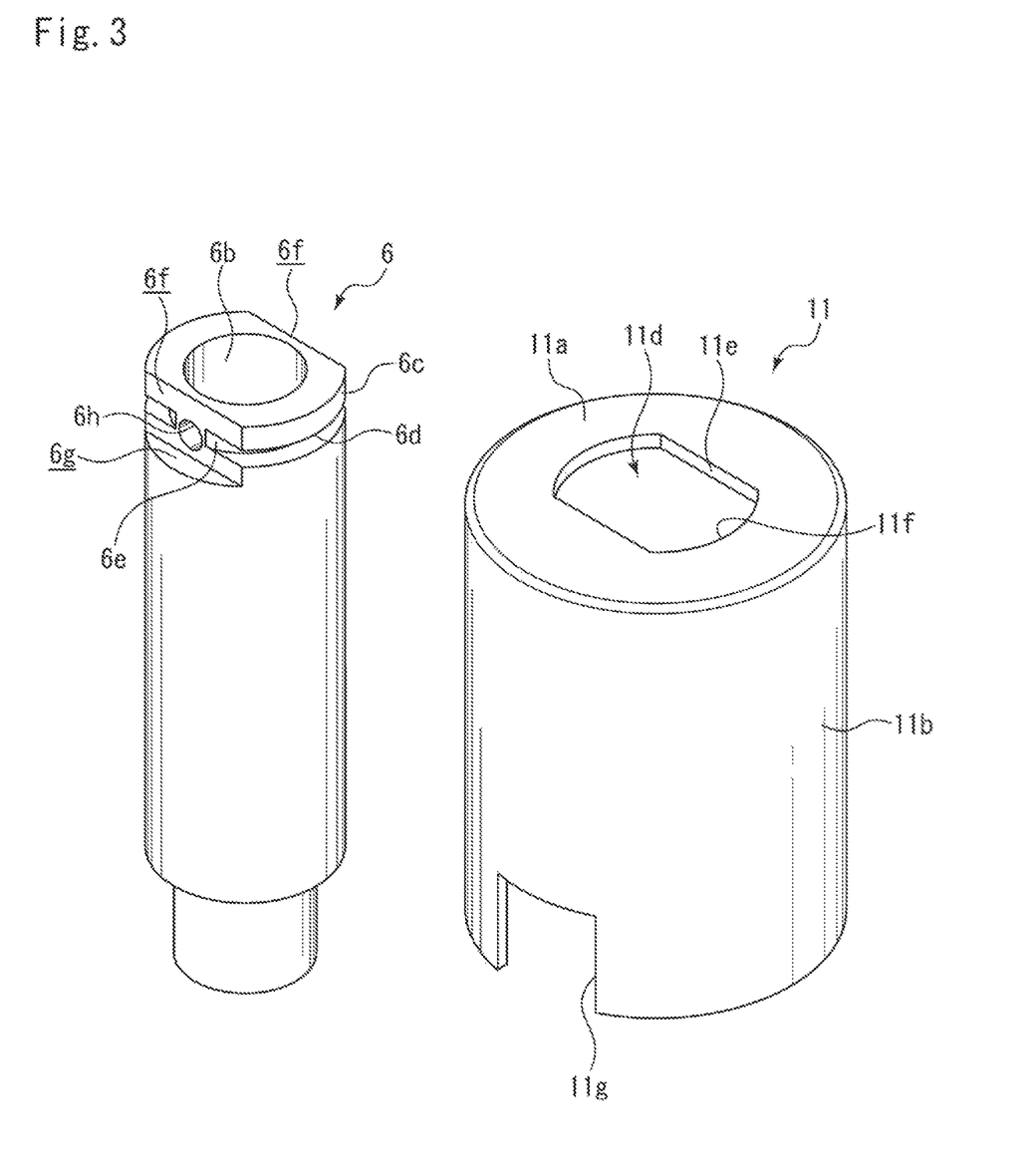
FIG. 3 is a perspective view illustrating a sleeve and a solenoid case that form the solenoid valve main body of the embodiment of the present invention.

As illustrated in FIGS. 2 and 3, the valve unit 5 includes a sleeve 6 of which the outer periphery is provided with openings such as input ports 6a (refer to FIG. 1) and output ports (not illustrated) that are connected to flow paths (not illustrated) provided in the valve housing 2, the spool 7 that is liquid-tightly accommodated in a through hole 6b of the sleeve 6 and has a plurality of lands 7a, a spring 8 with a coil shape that biases the spool 7 downward in an axial direction, and a retainer 9 that holds the spring 8. Since the valve unit 5 has well-known functions of the spool valve, the detailed description thereof will be omitted. Incidentally, the sleeve 6, the spool 7, and the retainer 9 are made of a material such as aluminum, steel, stainless steel, or resin. Furthermore, the input ports 6a and the output ports are not illustrated in FIG. 7 to be described later and FIG. 2.

As illustrated in FIG. 3, an end portion of the sleeve 6 has axial cut faces 6f, 6f formed in parallel with the axial direction so as to be opposite to each other over the center of the sleeve 6 and radial cut faces 6g, 6g formed in parallel with a radial direction so as to be opposite to each other over the center of the sleeve 6. Namely, the axial cut faces 6f, 6f form a pair of linear portions partially defining a stadium shape as seen from the axial direction, and the remaining portions of the stadium shape define a pair of circular arc portions. This means that the sleeve 6 includes one end portion with a stadium shape as seen from the axial direction.

In addition, in one end portion of the sleeve 6 on a side of axial cut faces 6, a pair of slits 6d is formed to extend in a circumferential direction and to be apart from an end face of the one end portion. As a result, a flange 6c is formed in the one end portion of the sleeve 6, an engagement face 6e with a circular arc shape is formed on an inner diameter side of the slit 6d, and the axial cut face 6f is a face formed with a substantially H shape. In addition, a breathing hole 6h is formed in the axial cut face 6f which is a linear portion, to serve as a first breathing hole which is a drain port penetrating through the one end portion of the sleeve 6 in the radial direction, and the breathing hole 6h communicates with the through hole 6b.

As illustrated in FIG. 2, an end portion of the spool 7 on a side of a plunger 34 is provided with a protrusion portion 7b having a small diameter which protrudes into a through hole 33a of a stator 33 to be described later, and a shoulder portion 7c from which the protrusion portion 7b protrudes in the axial direction and which comes into contact with the stator 33.

The solenoid unit 10 mainly includes a solenoid case 11, a molded solenoid body 12 that is accommodated in the solenoid case 11, an accommodation portion 30 that is positioned on an inner peripheral side of the molded solenoid body 12, and an end plate 36 that is fixed to the solenoid case 11 by swaging an end of the solenoid case 11.

As illustrated in FIG. 3, the solenoid case 11 has a cup shape where a plate portion 11a with a disk shape is connected to a cylindrical portion lib with a pipe shape. An opening 11d with a stadium shape having a slightly larger outline than that of the end portion of the sleeve 6 and including a pair of linear portions 11e and a pair of circular arc portions 11f is formed at the center of the plate portion 11a with a disk shape, and a cutout portion 11g into which a connector portion 16 is inserted is formed in an end portion of the cylindrical portion lib which is opposite to the plate portion 11a.

As illustrated in FIG. 2, a coil 13 and a lower plate 14 are integrally molded with a resin 15 to form the molded solenoid body 12, and a control voltage is supplied to the molded solenoid body 12 from a connector of the connector portion 16 extending outside the solenoid case 11. The coil 13 generates a magnetic field depending on the control voltage, and the magnetic field generates a driving force which is a magnetic attraction force applied to the plunger 34 in the axial direction. The driving force moves the spool 7 against the biasing force of the spring 8 in the axial direction via the plunger 34 and the rod 35.

The accommodation portion 30 mainly includes an inner peripheral face of a side ring 31 which has an annular shape and in which a flange extending in the radial direction is formed, an inner peripheral face of a spacer 29 which has an annular shape and is disposed on an inner peripheral side of the side ring 31, an inner peripheral face of a spacer 32 with a ring shape, and the through hole 33a which is formed in the stator 33 in the axial direction, and the inner peripheral faces and the through hole 33a are disposed in order opposite to the end plate 36.

The plunger 34 and the rod 35 are disposed in an inner space of the accommodation portion 30 and movable in the axial direction. The plunger 34 is movable in the axial direction while an outer peripheral face of the plunger 34 is guided by the inner peripheral face of the spacer 29 with an annular shape, and the rod 35 is configured to include a spacer portion 35b that is disposed in a recess portion 33b which is formed in the stator 33 on a valve unit 5 side of the plunger 34, and a main body portion 35a that is guided and movable in the through hole 33a of the stator 33 in the axial direction. In addition, the plunger 34 and the rod 35 are configured to be integrally movable. Incidentally, the rod 35 may be fixed to the protrusion portion 7b of the spool 7.

The inner space of the accommodation portion 30 includes a space S1 that is partially defined by the end plate 36 and the plunger 34 and a space S2 that is defined by the plunger 34 and the recess portion 33b, the space S2 communicating with a space S3 in the through hole 33a.

Figure 4:
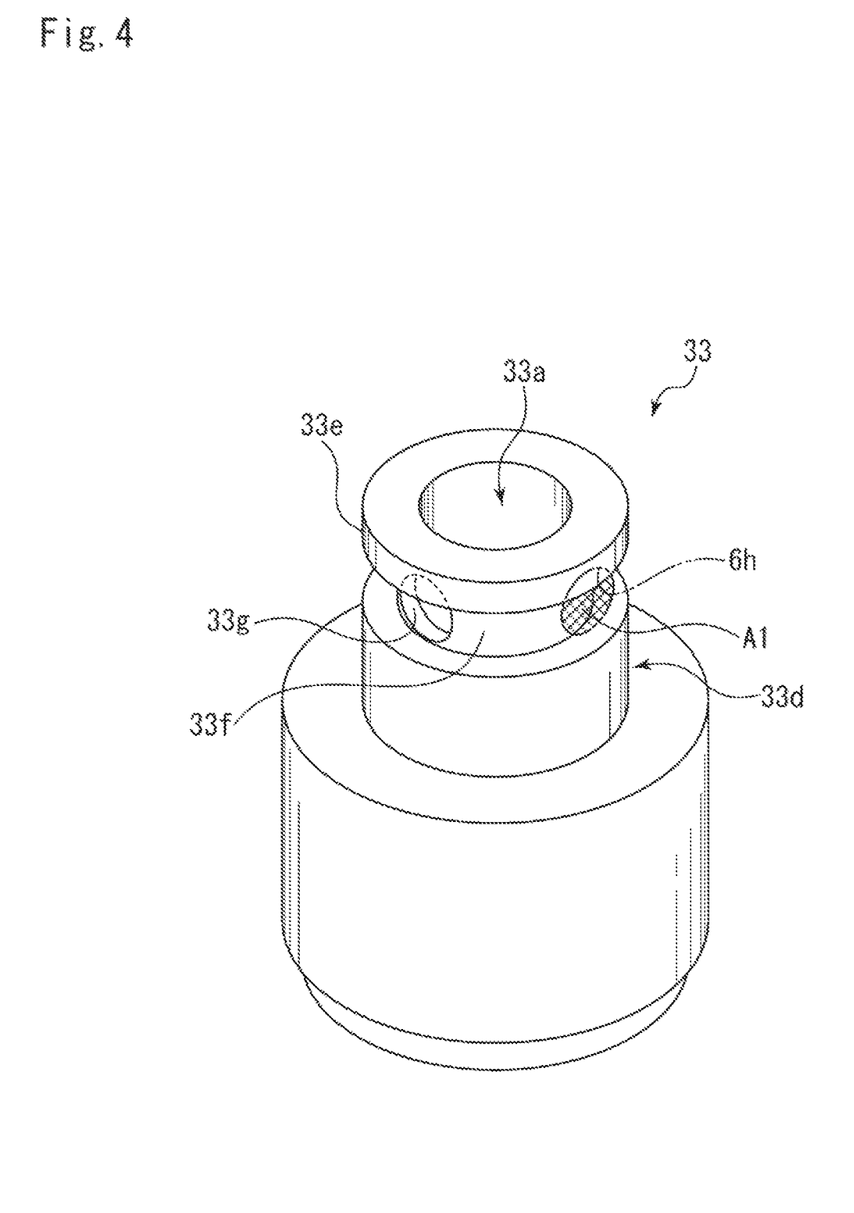
FIG. 4 is a perspective view illustrating a stator of the embodiment of the present invention.

As illustrated in FIGS. 2 and 4, an end portion 33d of the stator 33 on a side of the spool 7 is fitted into an end portion of the sleeve 6 on a side of the solenoid case 11. In addition, a recess groove 33f with an endless annular shape is circumferentially formed in an outer peripheral face 33e of the end portion 33d, and a breathing hole 33g which serves as a second breathing hole penetrating through the end portion 33d in the radial direction is formed in a bottom face of the recess groove 33f.

Figure 5:
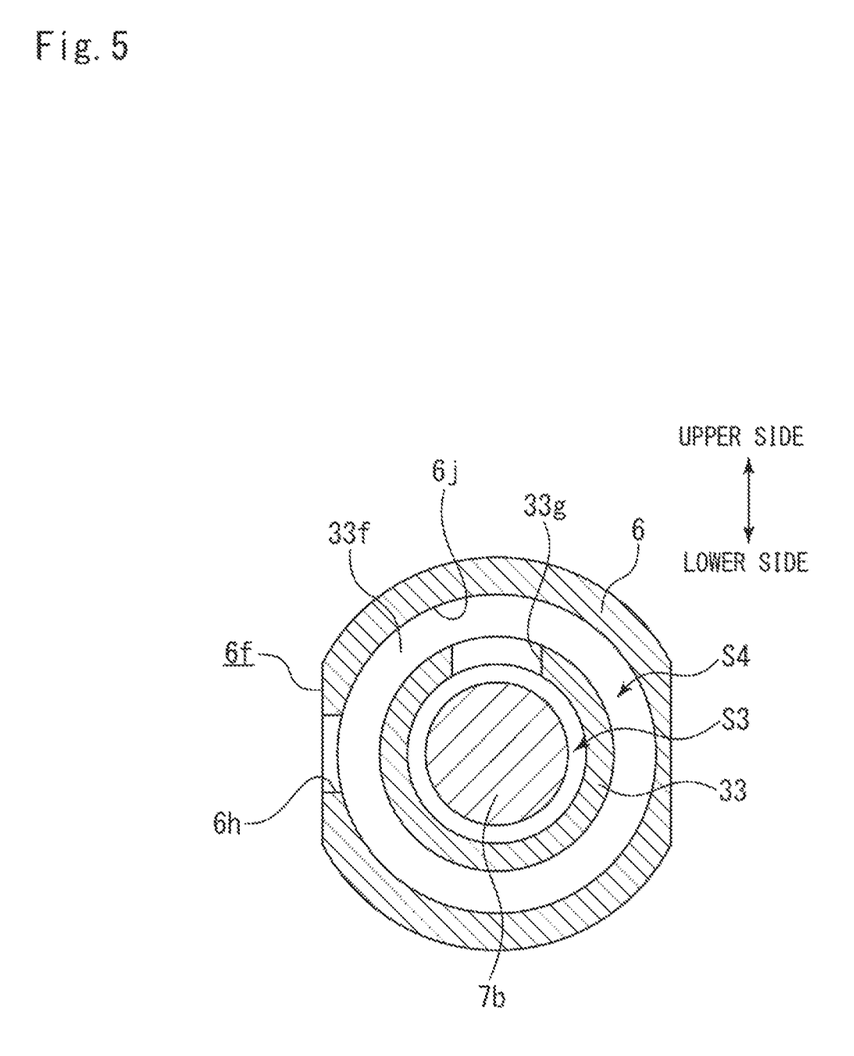
FIG. 5 is a cross-sectional view taken along a line B-B shown in FIG. 2, for illustrating a breathing path of the solenoid valve main body through which a breathing hole of the sleeve communicates with a breathing hole of a stator.

A space S4 is defined, as illustrated in FIG. 5, by the recess groove 33f and an inner peripheral face 6j of the end portion of the sleeve on a side of the solenoid case 11, the space S4 communicating with the breathing hole 6h of the sleeve 6. The outer peripheral face 33e of the end portion 33d of the stator 33 is in liquid-tight contact with the inner peripheral face 6j of the end portion of the sleeve 6 on a side of the solenoid case 11. The entire fluid which flows into the sleeve 6 from outside the solenoid valve main body 3 through the breathing hole 6h of the sleeve 6 is guided to the space S4. The breathing hole 33g communicates with the space S3 in the through hole 33a of the stator 33 and the space S4.

Figure 6:
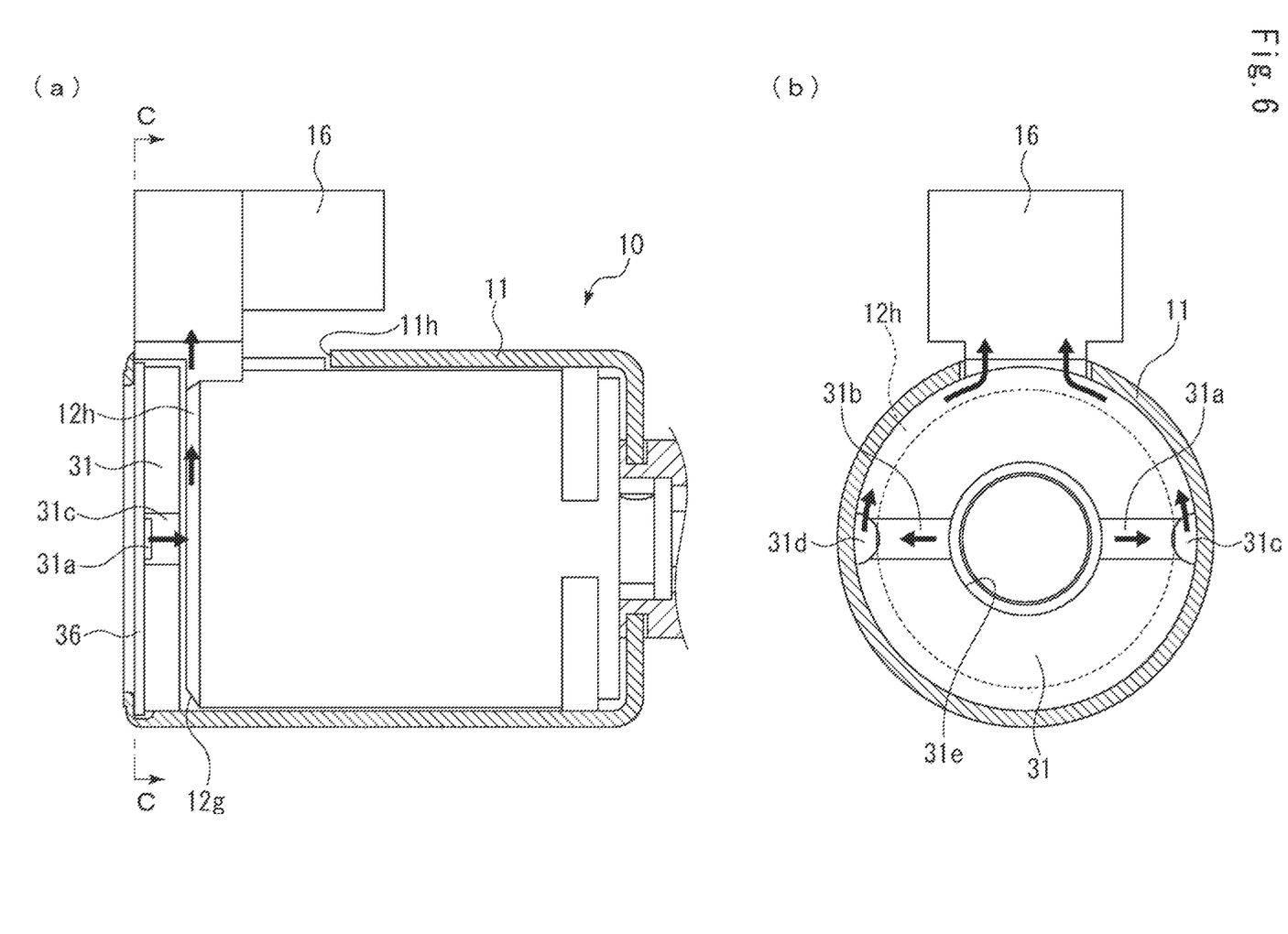
FIG. 6 illustrates views describing the breathing path of the solenoid valve main body of the embodiment of the present invention.
Figure 7:
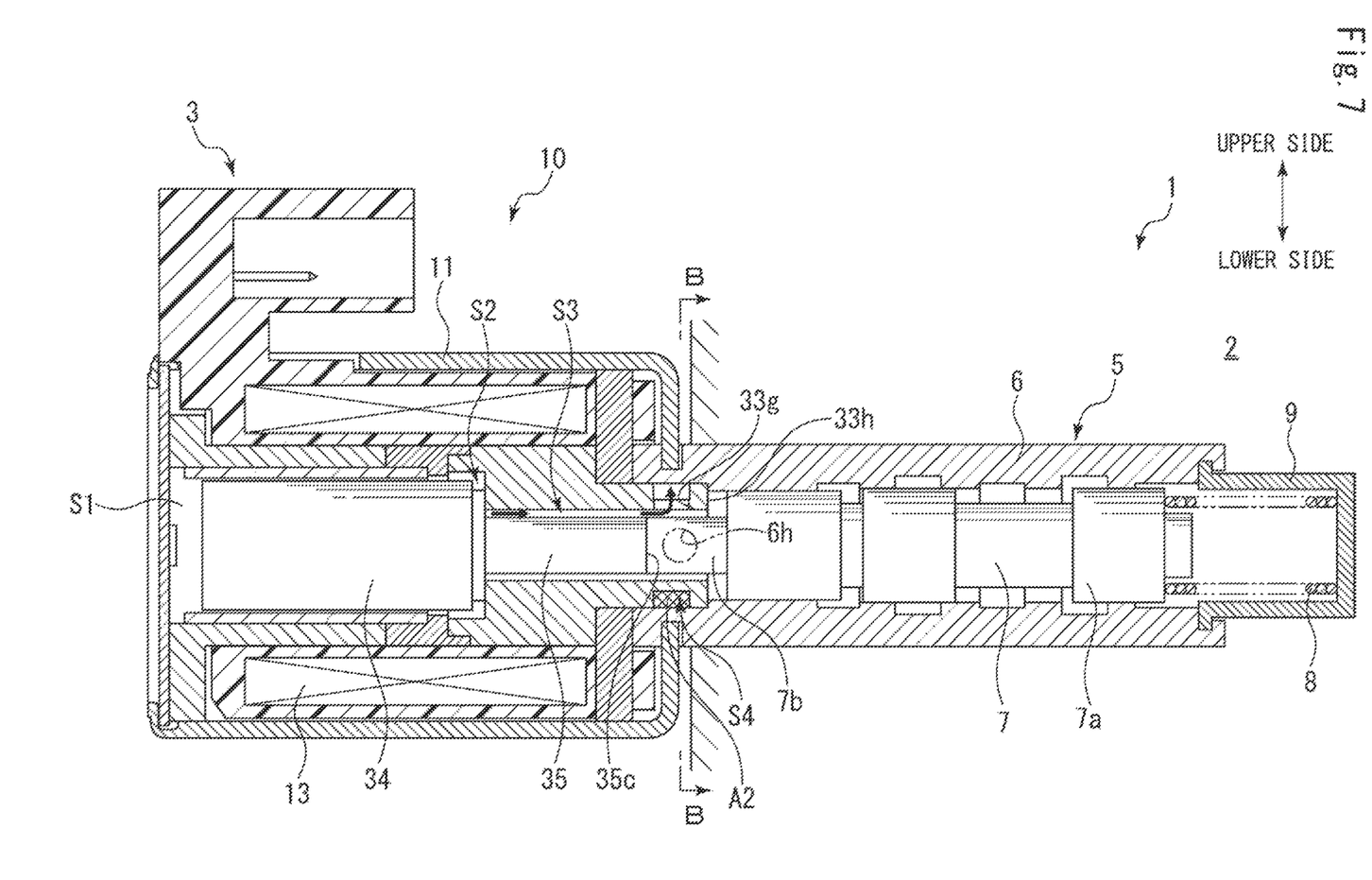
Figure 8:
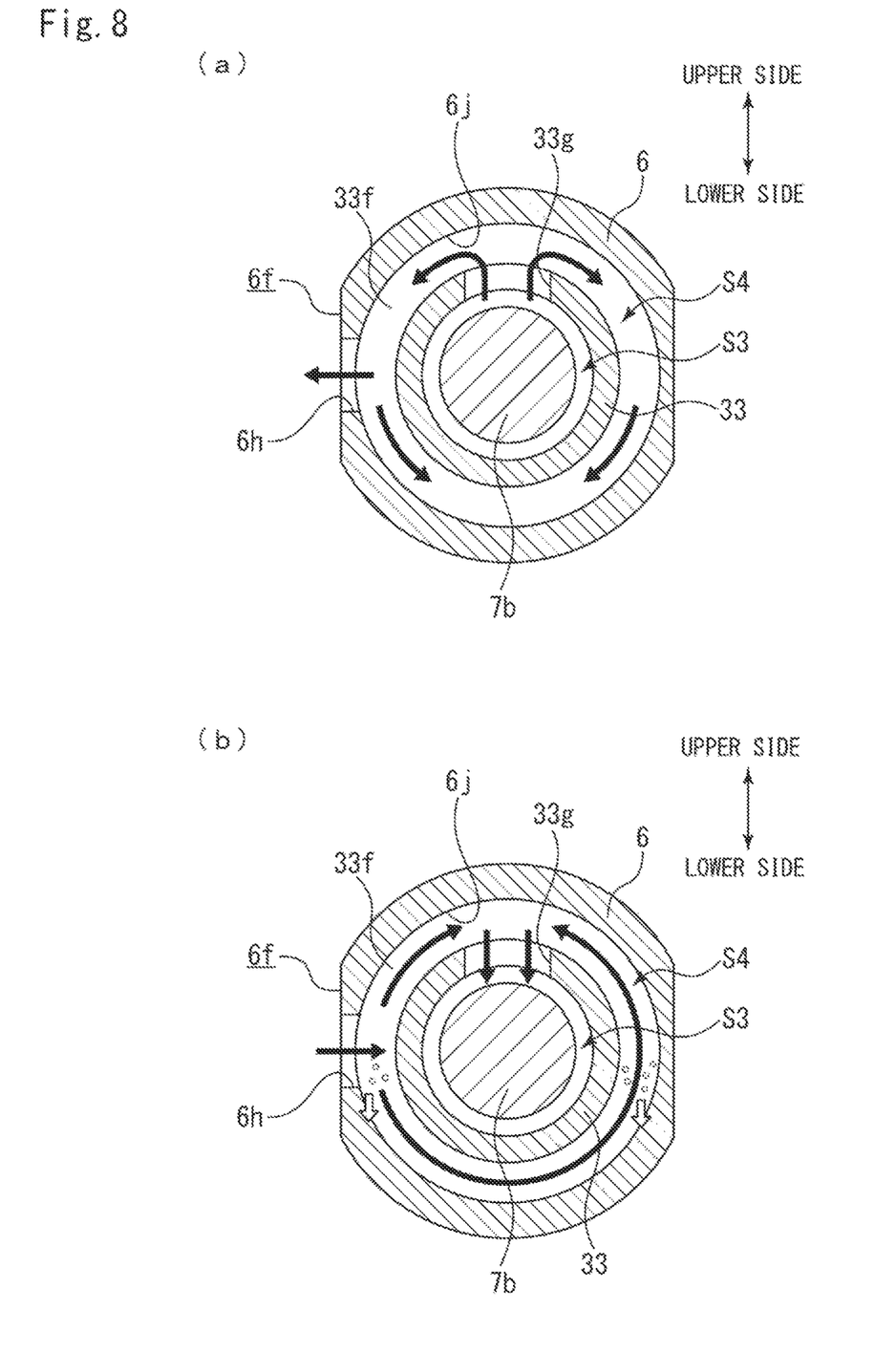
FIG. 8 illustrates cross-sectional views taken along the line B-B shown in FIG. 7, for illustrating the breathing path of the solenoid valve main body through which the breathing hole of the sleeve communicates with the breathing hole of the stator.

As illustrated in FIG. 6, radial grooves 31a and 31b are formed in an end face of the side ring 31 on a side of the end plate 36 to communicate with a central opening 31e and an outer periphery of the side ring 31, and axial grooves 31c and 31d are formed at the outer periphery of the side ring 31 to communicate with the radial grooves 31a and 31b and extend in the axial direction. In addition, a chamfered portion 12g is formed in an outer peripheral angled portion of an end face of the molded solenoid body 12 on a side of the end plate 36; and thereby, a circumferential path 12h is formed to run around an outer periphery of the end of the molded solenoid body 12 between the solenoid case 11 and the side ring 31. The circumferential path 12h communicates with the axial grooves 31c and 31d, and communicates with an opening 11h of the solenoid case 11 at a position that is offset approximately 90° from the axial grooves 31c and 31d. Namely, the space S1 (refer to FIG. 2) on a side of the end plate 36 side communicates with the outside of the solenoid valve main body 3 through the central opening 31e, the radial grooves 31a and 31b, and the axial grooves 31c and 31d which are formed in the side ring 31, the circumferential path 12h, and the opening 11h of the solenoid case 11.

Subsequently, one example of the sequence of assembling the solenoid valve main body 3 will be described. The valve unit 5 is assembled by firstly inserting the spring 8 and the spool 7 into the sleeve 6 and thereafter fixing the retainer 9 to the sleeve 6 through swaging process. Subsequently, the sleeve 6 and the solenoid case 11 are retained with each other in a state where the linear portions 11e of the opening 11d is interposed in the slit 6d (i.e., the state illustrated in FIG. 1) by inserting the flange 6c of the sleeve 6 into the opening 11d of the solenoid case 11 and rotating the sleeve 6 around the axis thereof 90 degrees at a position where the slit 6d corresponds to the opening 11d. The outer diameter of the engagement face 6e which is an inside circular peripheral face of the slit 6d is substantially the same as a distance between both of the linear portions 11e and 11e of the opening 11d, and in the state illustrated in FIG. 1, inside faces of both of the linear portions 11e, 11e are in partial contact with the engagement faces 6e. In addition, in the state illustrated in FIG. 1, the end portion of the sleeve 6 on a side of the solenoid case 11 sleeve 6 is fitted onto the end portion 33d of the stator 33 on a side of the spool 7 (refer to FIG. 2), and the breathing hole 6h of the sleeve 6 and the breathing hole 33g of the stator 33 are disposed a phase difference of 90 degrees apart from each other in the circumferential direction as illustrated in FIG. 5.

Subsequently, a face of the lower plate 14 on a side of the sleeve 6 is brought into contact with an opposite face of the flange 6c by inserting the molded solenoid body 12 into the solenoid case 11 and fitting a recess portion (not illustrated) with substantially the same stadium shape onto the flange 6c with the stadium cross-sectional shape in the sleeve 6. Subsequently, the side ring 31, the spacer 32, and the stator 33 which form the accommodation portion 30 are inserted into the molded solenoid body 12; and thereby, a shoulder portion of the stator 33 and the flange 6c are brought into contact with the lower plate 14 to interpose the lower plate 14 therebetween, and a face of the stator 33 on a side of the sleeve is brought into contact with an opposite face of the shoulder portion 7c of the spool 7 to slightly move the spool 7 against the biasing force of the spring 8 in the axial direction. Finally, the solenoid valve main body 3 is assembled by fixing the end plate 36 to an end portion of the solenoid case 11 which is opposite to the sleeve 6, through swaging process. In this state (illustrated in FIG. 2), the spool 7 is biased toward the solenoid unit 10 by the spring 8.

As illustrated in FIG. 2, a mounting hole 2a is formed in the valve housing 2, and the sleeve 6 of the solenoid valve main body 3 is mounted into the mounting hole 2a. At the time, the solenoid valve main body 3 is mounted in the valve housing 2 such that at least a part of the breathing hole 6h of the sleeve is exposed outside the mounting hole 2a. In addition, the solenoid valve main body 3 is mounted in the valve housing 2 so that the breathing hole 33g of the stator 33 faces vertically upward.

In the solenoid valve main body 3 after assembly, the breathing hole 33g of the stator 33 opens in the same direction as that of the opening 11h of the solenoid case 11, and the breathing hole 6h of the sleeve 6 is disposed a phase difference of 90 degrees apart from the breathing hole 33g of the stator 33 in the circumferential direction. In other words, the breathing hole 6h and the breathing hole 33g are positioned such that a clockwise distance and an anticlockwise distance in the circumferential direction from the breathing hole 6h to the breathing hole 33g are different from each other. When assembly is performed, the breathing hole 33g of the stator 33 which is not visible from outside can be disposed to face vertically upward by mounting the solenoid valve main body 3 in the valve housing 2 such that the opening 11h of the solenoid case 11 which is visible from outside the solenoid valve main body 3 faces vertically upward and the breathing hole 6h of the sleeve 6 faces horizontally.

Subsequently, the operation of the solenoid valve main body 3 will be described. When a control power source is supplied in an OFF state illustrated in FIG. 2, due to a magnetic attraction force generated by the coil 13, as illustrated in FIG. 7, the plunger 34 and the rod 35 moves toward the valve unit 5, and then an end portion 35c of the rod 35 on a side of the valve unit 5 pushes the protrusion portion 7b of the spool 7 to move the spool 7 toward of the retainer 9. The amount of a control fluid which flows from the input port (not illustrated) to the output port of the valve unit 5 is determined in accordance with the position of the spool 7 (i.e., the positions of the lands 7a) inside the sleeve 6. That is, the amount of the control fluid increases upon the supply of current to the coil 13.

In addition, when the magnetic attraction force generated by the coil 13 becomes relatively weak, as illustrated in FIG. 2, due to the biasing force of the spring 8, the spool 7 moves toward the solenoid unit 10 and the shoulder portion 7c of the spool 7 comes into contact with a facing end face 33h of the stator 33 (i.e., an open end portion of the accommodation portion 30), so that the movement of the spool 7 is restricted, and the plunger 34 and the rod 35 move toward the end plate 36.

In both of the state illustrated in FIG. 2 where a control current is not supplied (i.e., a non-energized state) and the state illustrated in FIG. 6 where a control current is supplied (i.e., an energized state), the breathing hole 6h of the sleeve 6 is not closed by the rod 35 and the spool 7, and through the breathing hole 6h, the space S4 illustrated in FIG. 5 between the inner peripheral face 6j of the end portion of the sleeve 6 on a side of the solenoid case 11 and the recess groove 33f communicates with the outside of the solenoid valve main body 3 all the time. In addition, similarly, in both of the state illustrated in FIG. 2 where a control current is not supplied and the state illustrated in FIG. 6 where a control current is supplied, also the breathing hole 33g of the stator 33 allows the space S3 in the through hole 33a of the stator 33 illustrated in FIG. 5 to communicate with the space S4. That is, regardless of whether or not a control current is supplied, the outside of the solenoid valve main body 3, the space S4, the space S3, and the space S2 communicate with each other.

As illustrated in FIG. 7, when a control current is supplied in the non-energized state, the plunger 34 moves the spool 7 toward the retainer 9, and as illustrated by the arrow, oil which is a fluid in the space S2 flows into the space S3. As illustrated in FIG. 8A, since the breathing hole 33g of the stator 33 is formed to face vertically upward, the fluid which has flown into the space S3 flows through the space S3 to flow into the space S4 through the breathing hole 33g of the stator 33. The fluid which has flown into the space S4 is discharged outside the solenoid valve main body 3 from the breathing hole 6h of the sleeve 6.

As described above, the fluid in the space S2 is rapidly discharged outside through the foregoing breathing path; and thereby, it is possible to improve the responsiveness of the solenoid valve main body 3.

In addition, as illustrated in FIG. 2, when the supply of a control current is stopped or a control current is reduced, due to the biasing force of the spring 8, the plunger 34 and the rod 35 move toward the end plate 36, and a fluid can rapidly flow into the space S2 from outside through the foregoing breathing path; and thereby, also in this case, it is possible to improve the responsiveness of the solenoid valve main body 3.

At the time, as illustrated by the arrows in FIGS. 6A and 6B, a fluid in the space S1 is discharged outside the solenoid valve main body 3 through the central opening 31e, the radial grooves 31a and 31b, and the axial grooves 31c and 31d which are formed in the side ring 31, the circumferential path 12h, and the opening 11h of the solenoid case 11.

As described above, the fluid in the space S1 is rapidly discharged outside through the foregoing breathing path; and thereby, it is possible to improve the responsiveness of the solenoid valve main body 3. In addition, when a control current is supplied in the non-energized state to cause the plunger 34 to move to the direction of the valve unit 5, a fluid can rapidly flow into the space S1 from outside through the foregoing breathing path; and thereby, also in this case, it is possible to improve the responsiveness of the solenoid valve main body 3.

In addition, as illustrated in FIG. 2, in a case where the supply of a control current is stopped or a control current is reduced in the energized state, when the plunger 34 and the rod 35 move toward the end plate 36 due to the biasing force of the spring 8, a fluid is drawn from outside the solenoid valve main body 3 through the breathing hole 6h of the sleeve 6. As described above, since the breathing hole 33g of the stator 33 and the breathing hole 6h of the sleeve 6 communicate with each other through the space S4 that is defined between the stator 33 and the sleeve 6, a fluid flowing from outside the solenoid valve main body 3 through the breathing hole 6h of the sleeve 6 passes through the space S4 that is defined between the stator 33 and the sleeve 6; and thereby, it is possible to reduce the possibility of contaminants which exist around outside the solenoid valve main body 3 penetrating into the space S2, and it is possible to improve contamination resistance.

In addition, since a fluid flowing from the space S2 to the breathing hole 33g of the stator 33 passes through the space S4 formed between the stator 33 and the sleeve 6, i.e., the fluid passes through a long path, the fluid more than needed is prevented from being discharged outside the solenoid valve main body 3; and thereby, it is possible to easily hold the fluid in the space S2 and prevent a negative pressure from occurring when the plunger 34 moves, and thus, it is possible to reduce resistance imposed by the fluid.

In addition, as illustrated in FIG. 8B, a part of a fluid which has flown into the space S4 from the breathing hole 6h of the sleeve 6 flows into an upper side of the space S4, and the remainder flows into a lower side of the space S4. At the time, after the fluid which has flown into the lower side of the space S4 is guided in the space S4 to move a long distance corresponding to approximately 270 degrees in the circumferential direction, the fluid flows into the space S3 from the breathing hole 33g of the stator 33. In such a process of moving a relatively long distance counterclockwise, contaminants of heavy specific gravity in the fluid can effectively fall to the lower side of the space S4, and the fluid having a reduced contaminant content can be taken into the space S3.

On the other hand, after the fluid which has flown into the upper side of the space S4 is guided in the space S4 to move a short distance corresponding to approximately 90 degrees in the circumferential direction, the fluid flows into the space S3 from the breathing hole 33g of the stator 33. Since the fluid which has flown into the upper side of the space S4 moves a shorter distance clockwise compared to the fluid which has flown into the lower side of the space S4, to reach the breathing hole 33g of the stator 33, it is possible to rapidly deliver the fluid into the space S2 on the valve unit 5 side of the plunger 34 through the space S3; and thereby, it is possible to effectively improve the responsiveness of the solenoid valve main body 3. Incidentally, since also contaminants in the fluid which has flown into the upper side of the space S4 fall to the lower side of the space S4, it is possible to prevent contaminants from penetrating into the space S2.

In summary, since the fluid which has flown into the space S4 from the breathing hole 6h of the sleeve 6 is divided into a fluid which moves a relatively short distance from the upper side of the space S4 to flow into the breathing hole 33g of the stator 33, and a fluid which moves a relatively long distance from the lower side of the space S4 to flow into the breathing hole 33g of the stator 33, it is possible to rapidly deliver the fluid into the space S2, and it is possible to reduce the overall contaminant content in the fluid which flows into the breathing hole 33g of the stator 33 from these two directions.

In addition, since the moving distance from the breathing hole 6h of the sleeve 6 to the breathing hole 33g of the stator 33 on the upper side of the space S4 differs from the moving distance from the breathing hole 6h of the sleeve 6 to the breathing hole 33g of the stator 33 on the lower side of the space S4, there occurs a difference in resistance to the fluid in the space S4 due the different moving distances, and thus the flow speeds of the fluids moving the different distances differ from each other. For this reason, the flow of the fluid in the space S4 tends to deviate to the movement direction where the flow speed is higher, and due to this flow, contaminants contained in the fluid is pressed to an outside inner peripheral face of the space S4 by the centrifugal force; and thereby, it is difficult for the contaminants to penetrate into the space S3.

In addition, since the breathing hole 33g of the stator 33 is formed to face vertically upward in a state where the solenoid valve main body 3 is mounted in the valve housing 2, contaminants which are contained in the fluid flowing from outside the solenoid valve main body 3 through the breathing hole 6h of the sleeve 6 are easily accumulated in a lower portion in the direction of gravity in the space S4 formed between the stator 33 and the sleeve 6; and thereby, it is possible to effectively prevent the contaminants from penetrating into the space S3, which is formed by the through hole 33a of the stator 33, from the space S4 through the breathing hole 33g.

In addition, since the breathing hole 33g of the stator 33 is formed to face vertically upward in a state where the solenoid valve main body 3 is mounted in the valve housing 2, a fluid which has flown into the spaces S2 and S3 can reliably stay in the spaces S2 and S3.

In addition, since the recess groove 33f with an endless annular shape is circumferentially formed at an outer periphery of the stator 33, and the space S4 is formed between the recess groove 33f and the inner peripheral face 6j of the end portion of the sleeve 6, a fluid which has flown into the space S4 is guided in the recess groove 33f in the circumferential direction, and regardless of the relationship of disposition of the breathing hole 33g of the stator 33 and the breathing hole 6h of the sleeve 6, the fluid can reliably move between the breathing hole 33g and the breathing hole 6h.

In addition, as described above, since the present invention adopts a structure where the space S4 is formed between the recess groove 33f formed at the outer periphery of the stator 33 and the inner peripheral face 6j of the end portion of the sleeve 6 on a side of the solenoid case 11, when the sleeve 6 is removed from the solenoid case 11, the stator 33 is exposed; and thereby, it is easy to clean contaminants remaining in the recess groove 33f formed at the periphery thereof.

In addition, as illustrated in FIG. 4, the breathing hole 6h of the sleeve 6 is disposed offset with respect to the recess groove 33f in the axial direction, and the flow path of the breathing hole 6h is narrowed. Accordingly, since a flow path cross-sectional area A2 (refer to FIG. 7) in the space S4 is larger than a flow path cross-sectional area A1 of a fluid flowing through the flow path of the breathing hole 6h, the flow speed of the fluid which has flown into the space S4 from the breathing hole 6h of the sleeve 6 is reduced; and thereby, contaminants are easily accumulated below in the space S4. Incidentally, in case where the flow path cross-sectional area A2 in the space S4 is set larger than the flow path cross-sectional area A1 of the breathing hole 6h, the breathing hole 6h of the sleeve 6 may not be offset with respect to the recess groove 33f in the axial direction. In this case, it is also possible to obtain the same effect.

In addition, since the space S4 is formed with an endless shape over the circumferential direction, in a case where contaminants are accumulated to the degree that the fluid is prevented from moving to the lower side of the space S4, the fluid can be rapidly discharged outside the solenoid valve main body 3 or taken into the space S3 through the upper side of the space S4.

The example of the present invention has been described above with reference to the drawings; however, the specific configuration is not limited to the example, and also changes or additions can be included in the present invention without departing from the scope of the present invention.

For example, in the foregoing example, in the solenoid valve main body 3 after assembly, the breathing hole 6h of the sleeve 6 is disposed at a position shifted by 90 degrees from the breathing hole 33g of the stator 33 in the circumferential direction. However, insofar as the breathing hole 6h and the breathing hole 33g are formed at different positions in the circumferential direction in such a manner that the clockwise travel distance and the anticlockwise travel distance therebetween are different from each other, the phase difference of the positions in the circumferential direction is not limited to 90 degrees and may be, for example, 120 degrees or the like.

In addition, the present invention is not limited to the configuration where the opening 11h of the solenoid case 11 and the breathing hole 6h of the sleeve 6 open in the same direction, and the opening 11h and the breathing hole 6h may be formed so as to have, for example, a phase difference of 90 degrees apart from each other in the circumferential direction.

In addition, the present invention is not limited to the configuration where the space S4 is formed between the recess groove 33f formed at the outer periphery of the stator 33 and the inner peripheral face 6j of the end portion on the solenoid case 11 side of the sleeve 6, and may adopt, for example, a configuration where a recess groove is provided in the inner peripheral face 6j of the end portion on the solenoid case 11 side of the sleeve 6 and the space S4 is formed between the recess portion and the outer peripheral face of the stator 33 from which a recess groove is removed.

In addition, instead of the configuration where the stator 33 is fitted into the sleeve 6, the present invention may adopt a configuration where the end faces of the sleeve 6 and the stator 33 in the axial direction are brought into contact with each other, and in this case, the space S4 may be formed by providing a recess groove in either one or both of the end faces of the sleeve 6 and the stator 33 in the axial direction.

In addition, the present invention is not limited to the configuration where the breathing hole 6h and the breathing hole 33g are provided in the sleeve 6 and the stator 33, respectively. For example, in the configuration where the end faces of the sleeve 6 and the stator 33 in the axial direction are brought into contact with each other, breathing holes equivalent to the breathing hole 6h and the breathing hole 33g may be defined by two pair of grooves, each of the two pair of grooves which are formed in the end faces of the sleeve 6 and the stator 33, respectively, so as to coincide with each other in circumferential position.

REFERENCE SIGNS LIST

1 Solenoid valve device
2 Valve housing
2a Mounting hole
3 Solenoid valve main body
5 Valve unit
6 Sleeve
6b Through hole
6h Breathing hole (first breathing hole)
6f Axial cut face (linear portion)
6j Inner peripheral face
7 Spool
7b Protrusion portion
8 Spring
9 Retainer
10 Solenoid unit
11 Solenoid case
11h Opening
12 Molded solenoid body
13 Coil
16 Connector portion
30 Accommodation portion
31 Side ring
33 Stator
33f Recess groove
33e Outer peripheral face
33a Through hole
33g Breathing hole (second breathing hole)
34 Plunger
35 Rod
36 End plate
A1 Flow path cross-sectional area
A2 Flow path cross-sectional area
S1 to S4 Space

The invention claimed is:

1. A solenoid valve device comprising:
a solenoid valve main body which includes a spool, a sleeve in which the spool is movably disposed in an axial direction, a plunger configured to move the spool, a stator, a molded solenoid body disposed at an outer periphery of the plunger, and a solenoid case accommodating the plunger, the stator, and the molded solenoid body,
at least a part of the plunger being disposed in an accommodation portion defined by the stator and the molded solenoid body; and
a valve housing in which the solenoid valve main body is mounted by inserting the sleeve of the solenoid valve main body into a mounting hole of the valve housing, wherein
the solenoid valve device includes a space with an annular shape which is continually formed in a circumferential direction between the sleeve and the stator, a first breathing hole which allows an outside of the solenoid valve main body to communicate with the space and a second breathing hole which allows the space to communicate with the accommodation portion,
the first breathing hole and the second breathing hole being positioned such that a clockwise distance and an anticlockwise distance in the circumferential direction from the first breathing hole to the second breathing hole are different from each other.

2. The solenoid valve device according to claim 1, wherein
the second breathing hole is formed to face vertically upward in a state where the solenoid valve main body is mounted in the valve housing.

3. The solenoid valve device according to claim 2, wherein
the first breathing hole is formed to face horizontally in a state where the solenoid valve main body is mounted in the valve housing.

4. The solenoid valve device according to claim 2, wherein
the first breathing hole is provided in the sleeve and the second breathing hole is provided in the stator.

5. The solenoid valve device according to claim 2, wherein
a flow path cross-sectional area in the space is larger than a flow path cross-sectional area of the first breathing hole.

6. The solenoid valve device according to claim 2, wherein
an end portion of the sleeve which is connected to the solenoid case is formed with a pair of linear portions and a pair of circular arc portions in a cross section perpendicular to the axial direction, and the first breathing hole is formed in the linear portion of the end portion.

7. The solenoid valve device according to claim 1, wherein
the first breathing hole is formed to face horizontally in a state where the solenoid valve main body is mounted in the valve housing.

8. The solenoid valve device according to claim 7, wherein
the first breathing hole is provided in the sleeve and the second breathing hole is provided in the stator.

9. The solenoid valve device according to claim 7, wherein
a flow path cross-sectional area in the space is larger than a flow path cross-sectional area of the first breathing hole.

10. The solenoid valve device according to claim 7, wherein
an end portion of the sleeve which is connected to the solenoid case is formed with a pair of linear portions and a pair of circular arc portions in a cross section perpendicular to the axial direction, and the first breathing hole is formed in the linear portion of the end portion.

11. The solenoid valve device according to claim 1, wherein
the first breathing hole is provided in the sleeve and the second breathing hole is provided in the stator.

12. The solenoid valve device according to claim 11, wherein
a flow path cross-sectional area in the space is larger than a flow path cross-sectional area of the first breathing hole.

13. The solenoid valve device according to claim 11, wherein
an end portion of the sleeve which is connected to the solenoid case is formed with a pair of linear portions and a pair of circular arc portions in a cross section perpendicular to the axial direction, and the first breathing hole is formed in the linear portion of the end portion.

14. The solenoid valve device according to claim 1, wherein
a flow path cross-sectional area in the space is larger than a flow path cross-sectional area of the first breathing hole.

15. The solenoid valve device according to claim 14, wherein
an end portion of the sleeve which is connected to the solenoid case is formed with a pair of linear portions and a pair of circular arc portions in a cross section perpendicular to the axial direction, and the first breathing hole is formed in the linear portion of the end portion.

16. The solenoid valve device according to claim 1, wherein
an end portion of the sleeve which is connected to the solenoid case is formed with a pair of linear portions and a pair of circular arc portions in a cross section perpendicular to the axial direction, and the first breathing hole is formed in the linear portion of the end portion.

* * * * *